G. F. WATT.
POSTING BOX.
APPLICATION FILED NOV. 23, 1908.
1,009,360.
Patented Nov. 21, 1911.
10 SHEETS—SHEET 2.
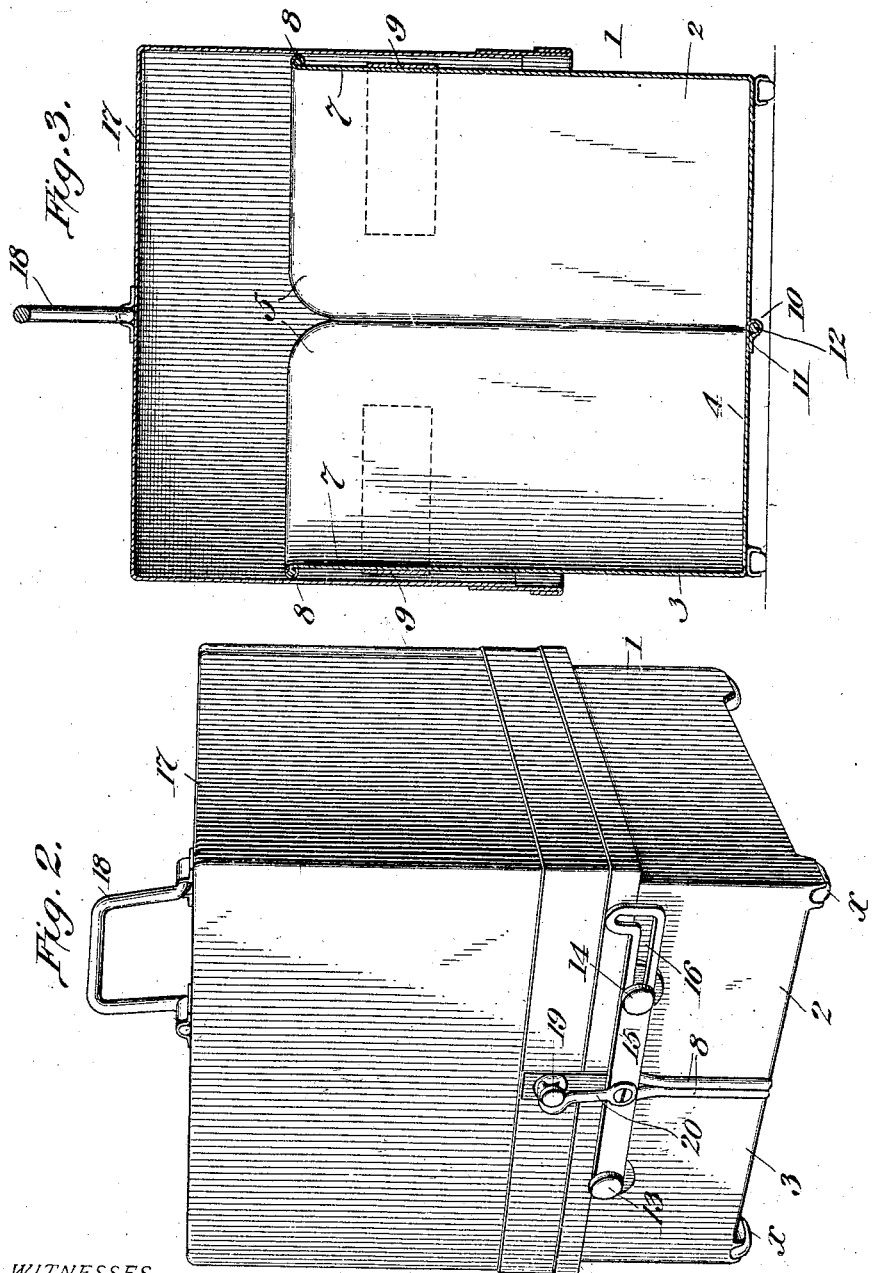
WITNESSES
INVENTOR,
George F. Watt.

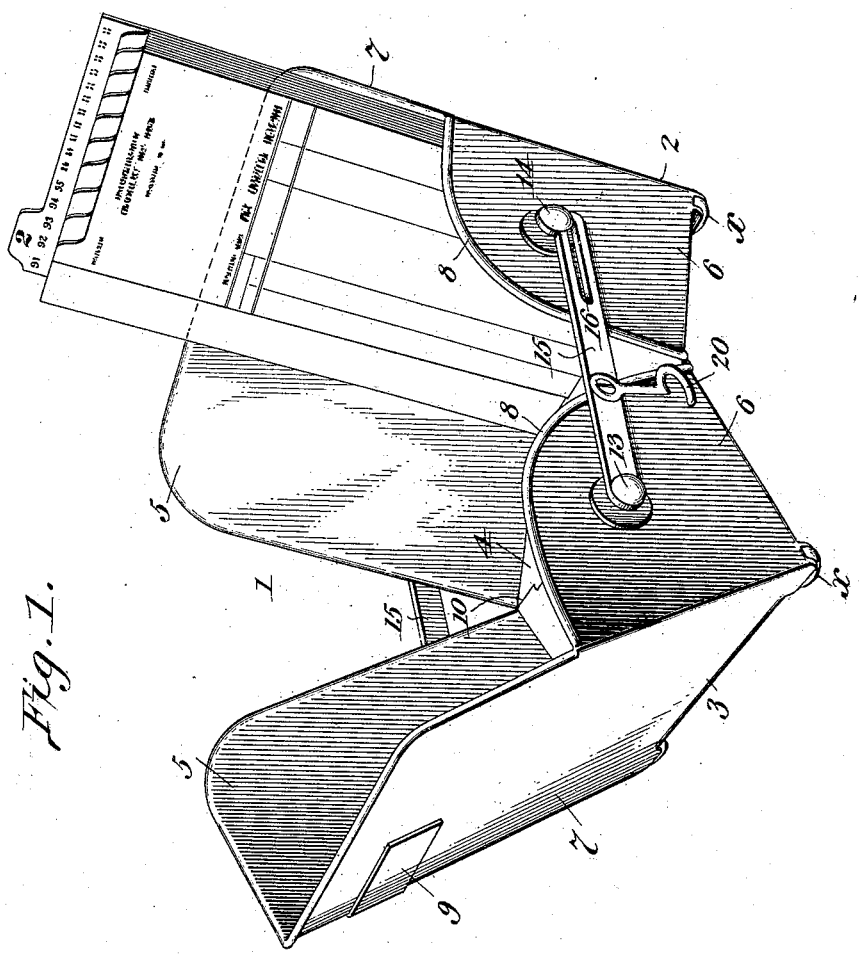

G. F. WATT.
POSTING BOX.
APPLICATION FILED NOV. 23, 1908.
1,009,360.
Patented Nov. 21, 1911.
10 SHEETS—SHEET 3.
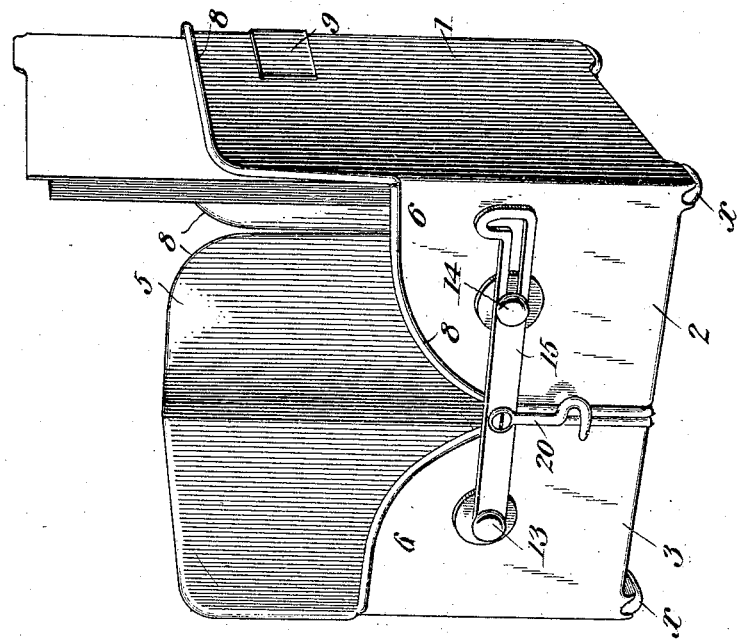
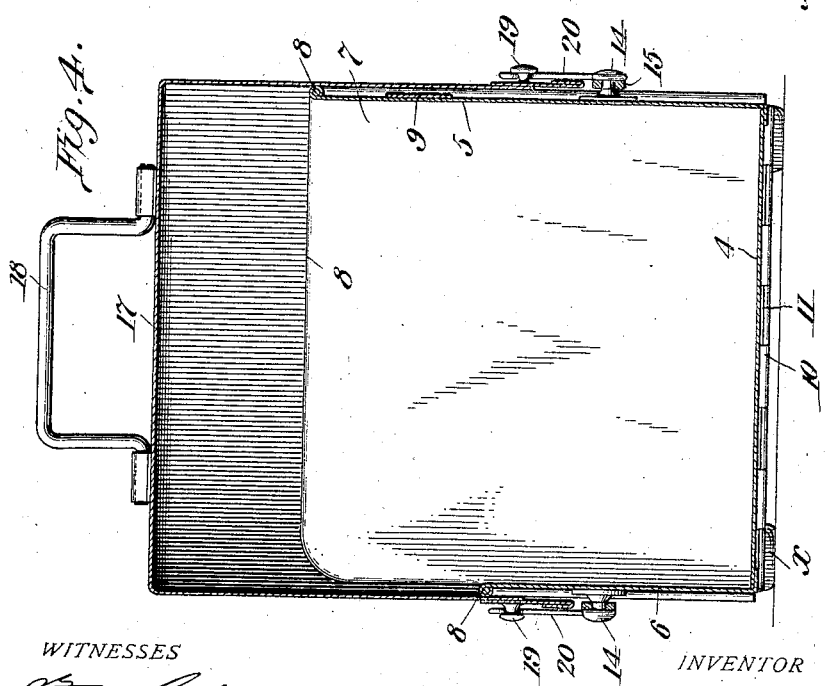
WITNESSES
INVENTOR
George F. Watt,

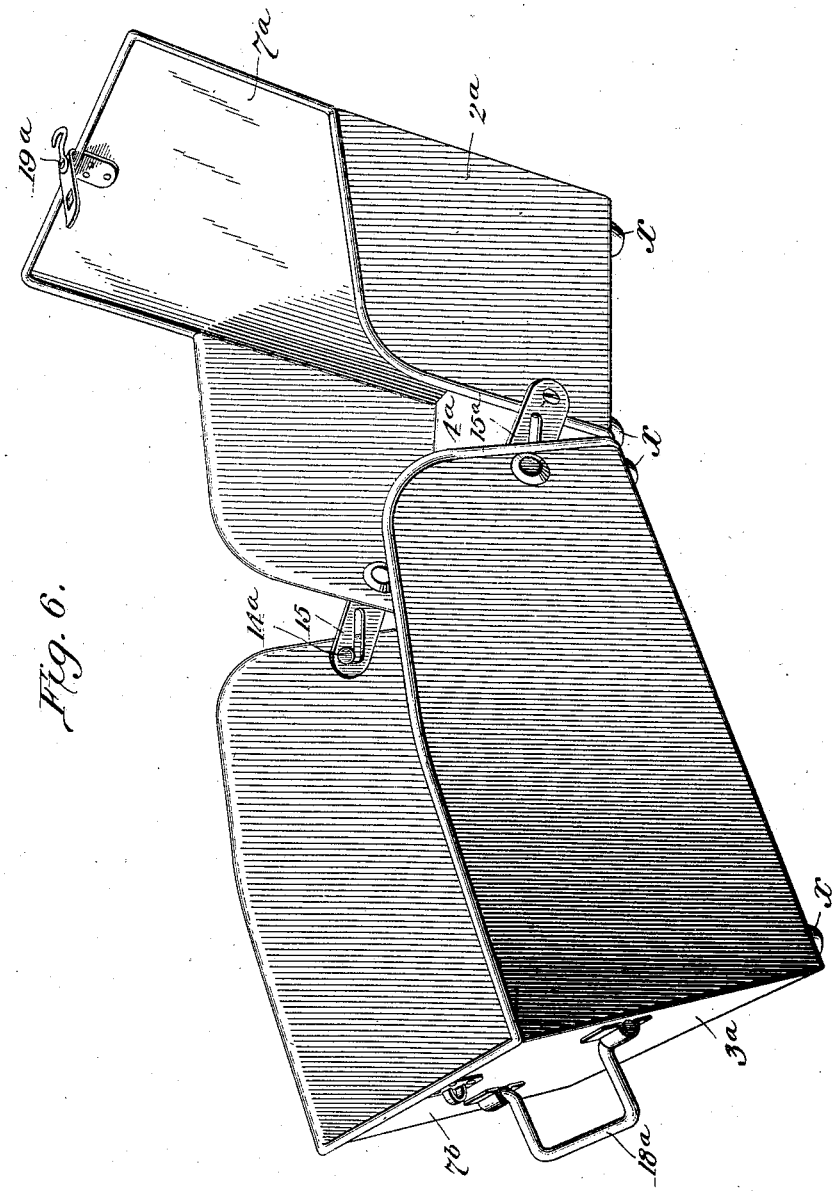

G. F. WATT.
POSTING BOX.
APPLICATION FILED NOV. 23, 1908.
1,009,360.
Patented Nov. 21, 1911.
10 SHEETS—SHEET 5.
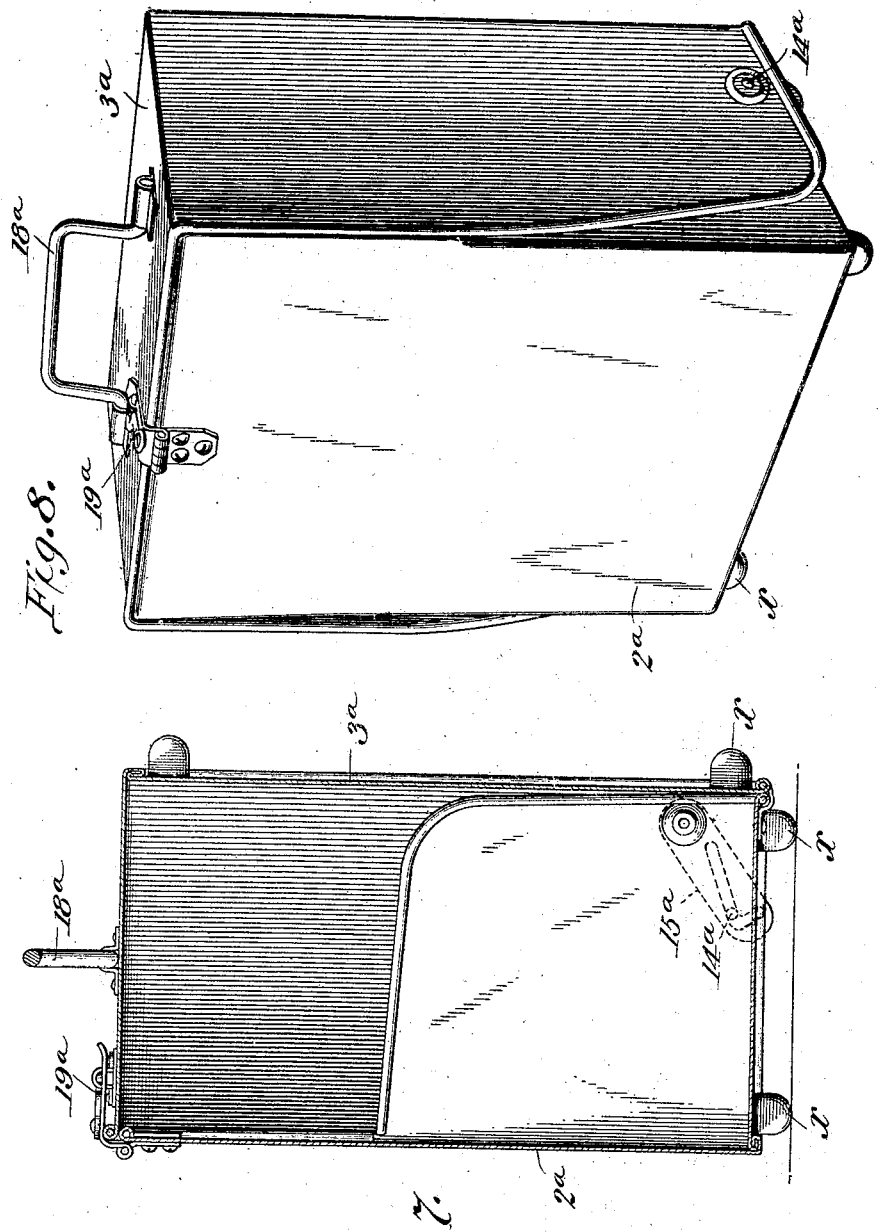

G. F. WATT.
POSTING BOX.
APPLICATION FILED NOV. 23, 1908.
1,009,360.
Patented Nov. 21, 1911.
10 SHEETS—SHEET 6.
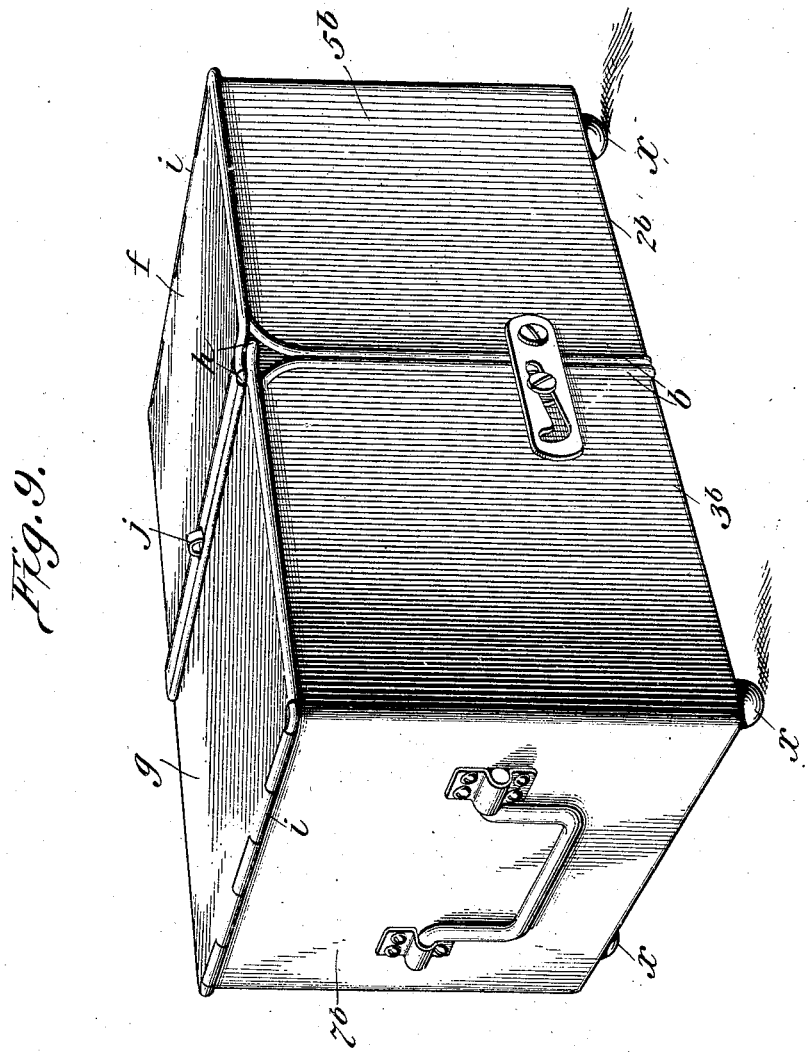
WITNESSES
INVENTOR,
George F. Watt.
By L. G. Julihn
Attorney

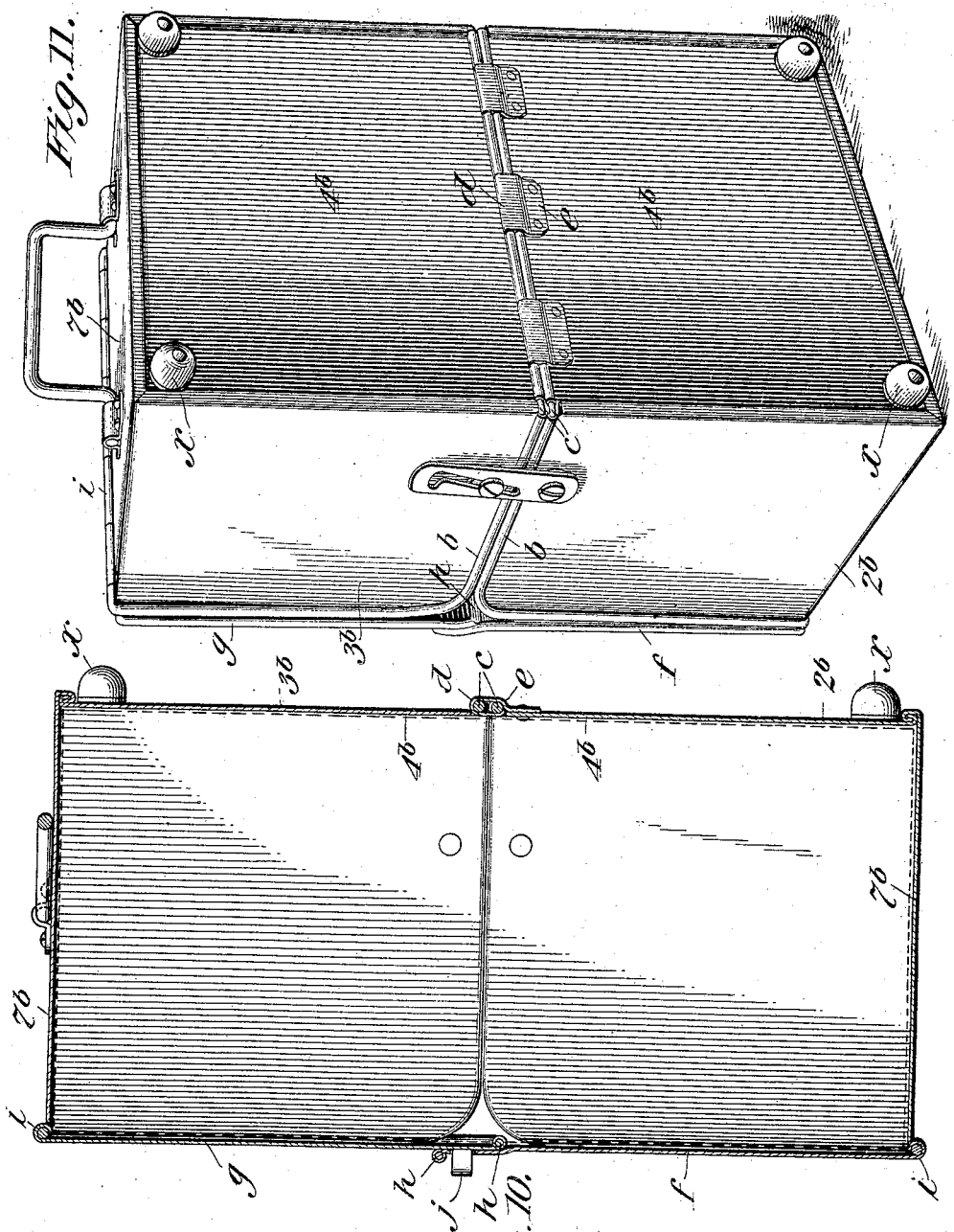

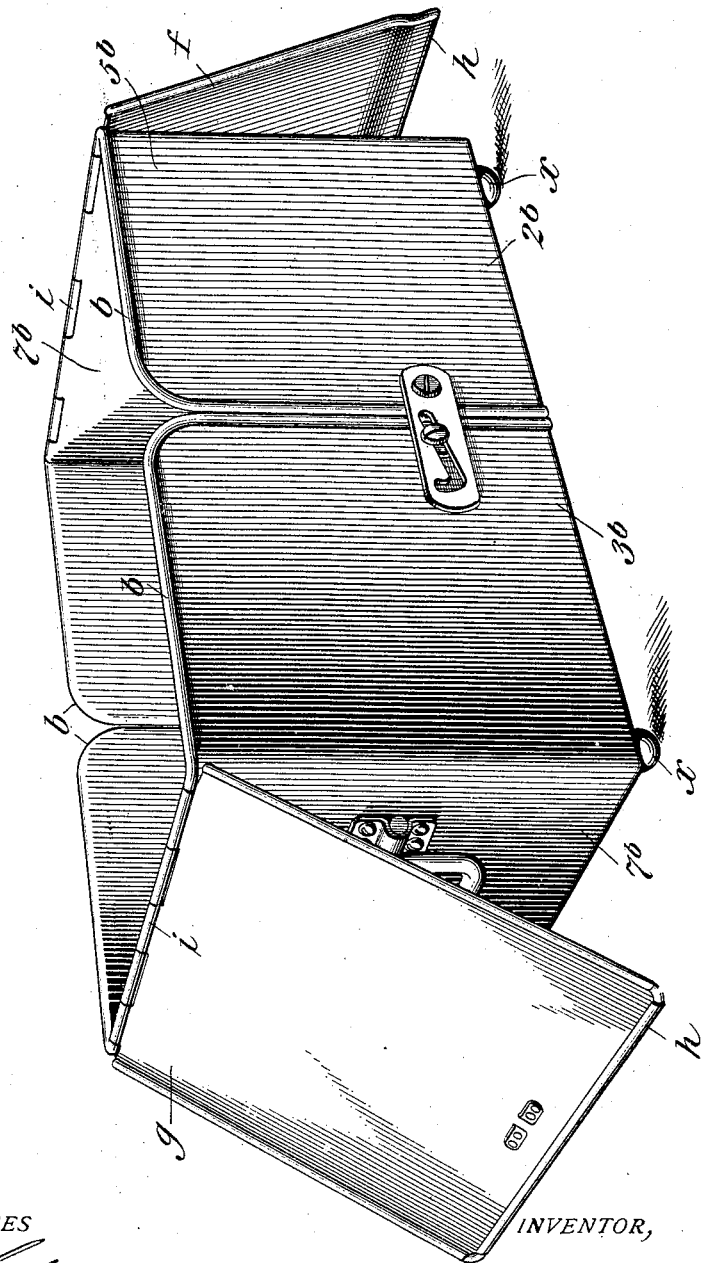

G. F. WATT.
POSTING BOX.
APPLICATION FILED NOV. 23, 1908.
1,009,360.
Patented Nov. 21, 1911.
10 SHEETS—SHEET 9.
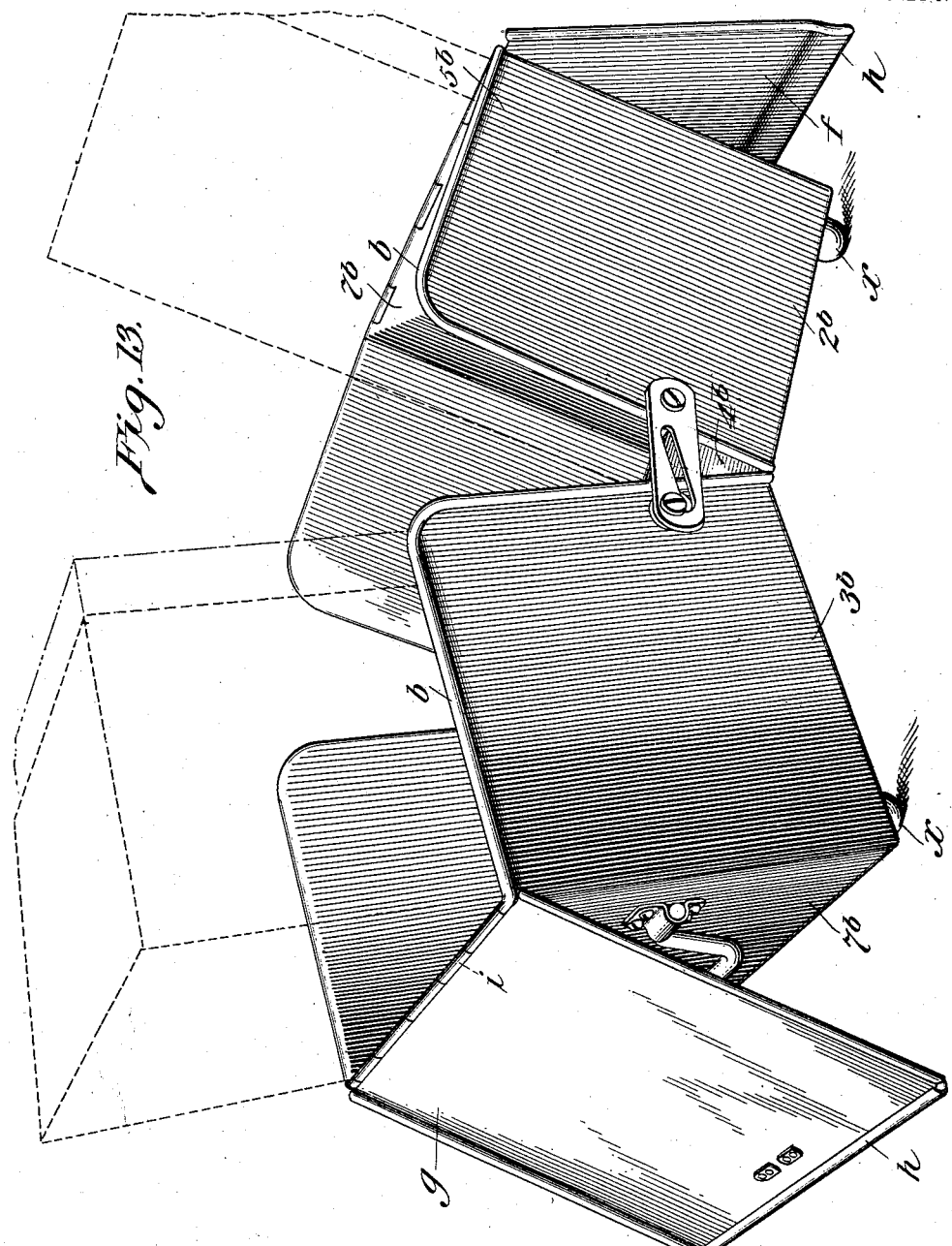
WITNESSES
INVENTOR,
George F. Watt.
by L. G. Julihn Attorney

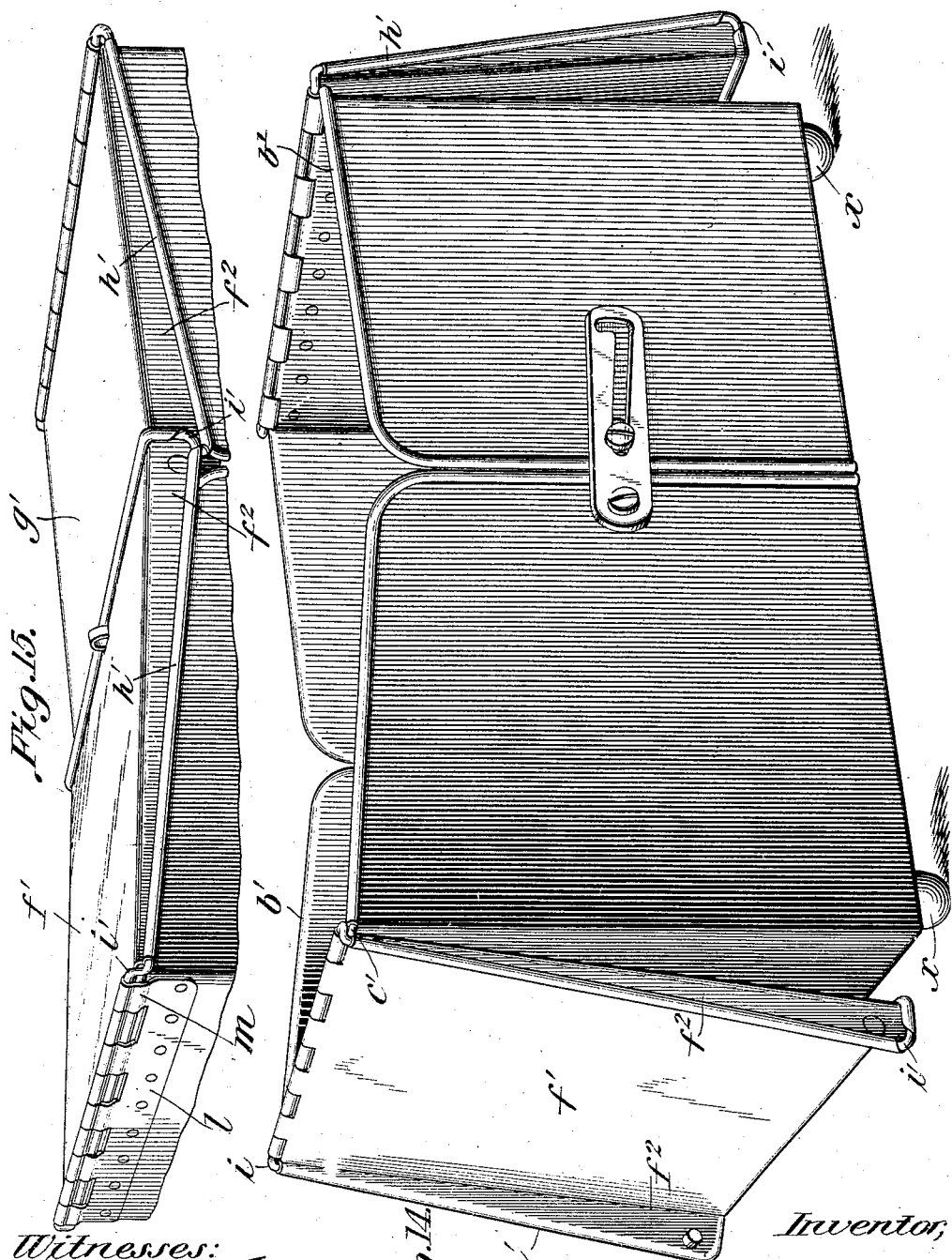

UNITED STATES PATENT OFFICE.

GEORGE F. WATT, OF HARRISBURG, PENNSYLVANIA, ASSIGNOR TO ELLIOTT-FISHER COMPANY, OF HARRISBURG, PENNSYLVANIA, A CORPORATION OF DELAWARE.

POSTING-BOX.

1,009,360.

Specification of Letters Patent.

Patented Nov. 21, 1911.

Application filed November 23, 1908. Serial No. 463,996.

*To all whom it may concern:*

Be it known that I, GEORGE F. WATT, a citizen of the United States of America, residing at Harrisburg, in the county of Dauphin and State of Pennsylvania, have invented certain new and useful Improvements in Posting-Boxes, of which the following is a specification.

This invention relates to a portable posting box or cabinet adapted more particularly for the reception of bill, statement, or other blanks upon which typewritten or other records are made from time to time.

An object of the invention is to produce a sectional box of compact form for the economical dust-proof storage of the blanks when not in use, but arranged when opened to provide angularly related compartments, one containing the blanks in indexed arrangement for convenient selection and the other adapted to receive the blanks after the entries have been made thereon, in order to facilitate the proving up of the entries when desired.

Another object of the invention is to provide simple and efficient means for automatically locking the sections of the box rigidly in position when opened or extended for use.

Other and subordinate objects of the invention will appear as the succeeding description of the several illustrated embodiments thereof is developed.

In the accompanying drawings Figure 1 is a perspective view of the posting box in use. Fig. 2 is a perspective view of the box as it appears when not in use. Fig. 3 is a vertical sectional view through the subject-matter of Fig. 2. Fig. 4 is a vertical sectional view taken at right angles to the line of section of Fig. 3. Fig. 5 is a perspective view of the box contracted or collapsed and ready to receive the cover. Fig. 6 is a perspective view of a modified form of box in which one section thereof is made to constitute the cover. Fig. 7 is a vertical sectional view of the box shown in Fig. 6. Fig. 8 is a perspective view of said box closed. Fig. 9 is a perspective view of a third form of box. Fig. 10 is a sectional view thereof. Fig. 11 is a perspective view of the third form of box showing the position it assumes when carried. Fig. 12 is a perspective view of the third form of box with the covers thrown back. Fig. 13 is a perspective view of the third form of box in use. Fig. 14 is a perspective view of a fourth form of box with the covers thrown back, and Fig. 15 is a perspective view of the upper portion of said box with the covers closed.

Referring first to Figs. 1 to 5 inclusive of the drawings, 1 indicates the box as a whole and 2 and 3 the relatively movable sections thereof each of which includes a bottom wall 4, side walls 5 and 6 and an end wall 7. The walls 6 at one side of the box are of considerably less height than the walls 5 and 7 and are rounded off at their upper inner corners to facilitate the manipulation of the contents of the box. For the purpose of stiffening the walls of each section a bead 8 is extended along the upper and inner edges of the walls 5 and 6 and thence along the intermediate edges of the wall 7. Additional stiffness is preferably though not necessarily secured by means of corner brackets 9. The sections 2 and 3 constructed as described have a hinged connection 10 along the inner edges of their bottom walls 4. This hinged connection may be effected in any approved manner, as for instance by tongues 11 integral with the bottom walls 4 and bent in opposite directions around a pintle 12.

It will now be seen that the sections 2 and 3 may assume a vertical position, as shown in Figs. 3 and 5, which is the closed or collapsed condition of the box, or may be swung apart, as shown in Fig. 1, to provide oppositely inclined receptacles for the cards, statements, or other contents. In the present instance the box is designed for the reception of properly indexed statement blanks *a*, which, in the open condition of the box, stand vertically in one of the box sections, see for instance the section 2 in Fig. 1, and rest against the end wall 7 thereof. The box is usually placed on a desk at one side of a typewriter, as for instance an Elliott-Fisher billing machine, and any statement upon which an entry is to be made can be readily withdrawn from the box and the entry made thereon. The statement is then replaced in the box, but in the other section, as for instance the section 3, so that, at the end of a given period, as for instance at the end of the day, the operator may remove all of the statements upon which entries have been made and after properly verifying the work, may redistribute the statements in the other or indexed section of the box.

The box as thus far described constitutes a complete embodiment of my invention in one aspect thereof because it is obvious that the hinged connection 11 may be so constructed that the frictional resistance to the relative swinging of the sections 2 and 3 will be sufficient to retain the same in the positions shown in Fig. 1 while permitting the sections to be swung together by the application of sufficient force. I prefer, however, to eliminate this element of friction in the hinge and to provide in lieu thereof simple and efficient means for securely holding the sections of the box in position when said sections are extended or thrown back for use. One embodiment of such means comprehends a pair of buttons 13 and 14 extended from the side walls 5 of the sections and coöperating with a latch 15.

The latch 15 is in the form of a metal bar swung at one end from the shank of the button 13 and provided at its opposite end with an angular slot 16 for the reception of the shank of the button 14. The major portion of the slot extends longitudinally of the latch bar, but the end of the slot farthest from the opposite end of the latch is disposed vertically, as shown in Fig. 2 for instance, so that, while the shank of the button is disposed normally in the horizontal portion of the slot 16, the act of separating or swinging back the box sections 2 and 3 from the position shown in Fig. 5 to that shown in Fig. 1 will cause the vertical portion of the slot to come opposite the shank of the button 14 at which time the latch bar 15 will drop by gravity and present the shank of the button within the vertical portion of the slot. In this position of the parts the vertical side walls of the angular extension of the slot 16 will constitute stops coacting with the button to resist relative movement of the box sections toward or away from each other.

Attention is directed to the fact that the action of the catch is entirely automatic upon the opening or extension of the box for use. Assuming the sections to be disposed vertically, as shown in Fig. 5, it is simply necessary to throw them back until, by the automatic operation of the latch 15, they are caught and held rigidly in their properly adjusted position. While a latch at one side only of the box will be entirely efficient, latches may be provided at both sides of the box as an additional precaution, as shown in the drawings.

Since one of the objects of the invention is to provide a box which when not in use will be dust-proof, as well as compact, I provide a rectangular cover 17 which may be slipped down over the box and fitted closely thereon when the box sections have been brought together, as shown in Fig. 3. The cover 17 is preferably provided with a suitable handle 18 and is equipped adjacent to the lower edges of the side walls with studs 19 adapted to be engaged by hooks 20 swung from some part of the receptacle, as for instance from the latch bars 15.

In Figs. 6 to 8 inclusive of the drawings I have shown a somewhat modified form of the invention. In this form the sections $2^a$ and $3^a$ are hingedly connected at the proximate edges of their bottom walls as in the form first described, but instead of being similarly constructed, the sections are dissimilar in several respects. The section $2^a$, which normally holds the indexed statements, is provided with an elevated end wall $7^a$ against which the statements rest and the bottom wall of the section $3^a$ approximately corresponds in length with the height of the wall $7^a$, while the width of the bottom wall $4^a$ of the section $2^a$ from its hinged edge to the wall $7^a$ is approximately equal to the height of the end wall $7^b$ of the section $3^a$. Furthermore, the side walls of the section of this second form of box, instead of being in the same plane as in the first form of box, are arranged out of coincidence. In other words, the width of the section $2^a$ is slightly less than the width of the section $3^a$ so that the latter may be swung to a vertical position to constitute a cover for the section $2^a$. In use the sections $2^a$ and $3^a$ are disposed with their bottom walls slightly inclined in opposite directions from the horizontal so that two oppositely inclined compartments for the indexed statements and the used statements are produced just as in that form of box first described. Similarly, these sections are held rigidly in this open or extended position by latch bars $15^a$ similar to the bars 15, a difference being that the buttons $14^a$ which coöperate with the angular slots in the latch bars extend from the inner sides of the side walls of the section $3^a$ in order to permit said side walls to swing outside of and opposite the side walls of the section $2^a$. When it is desired to close the box the latch bars are elevated by hand until the shanks of the buttons $14^a$ come opposite the horizontal portions of the slots in the bars $15^a$. The section $3^a$ may then be swung up to a vertical position, as shown in Figs. 7 and 8, to constitute a cover for the section $2^a$ containing the statement blanks. If desired, the end wall $7^b$ of the section $3^a$ may be provided with a handle $18^a$ and for the purpose of securing the sections together when closed a suitable catch $19^a$ may be provided.

In Figs. 9 to 13 inclusive still another form of box is shown. In this third form of box the sections $2^b$ and $3^b$ are of like construction and dimensions, and like the constructions heretofore described, are hingedly connected along the approximate edges of their bottom walls 4$^b$. The method whereby this hinge connection is accomplished is somewhat different, however, from that of the first form described and similar to that shown in the second form. It will be noticed by reference to Figs. 10 and 11 that a bead is formed along the exposed edges of each section of the box, that is to say, the upper inner edges of the side walls 5$^b$, the upper edge of the end wall 7$^b$ and the inner edges of the bottom wall 4$^b$ are rolled to form a hollow bead $b$, stiffened by a core wire $c$. At the adjacent edges of the bottom walls 4$^b$ the bead $b$ is cut away at intervals and the two core wires $c$ thereby exposed are encircled by the sleeves $d$ of hinge plates $e$ which may be integral with the bottom wall of one of the sections but are preferably formed separately and riveted to the bottom wall of the section 2$^b$, as shown in Figs. 10 and 11. This form of box, unlike those previously described, is provided with a sectional cover the sections of which may be regarded as individual covers $f$ and $g$ for the respective sections. These covers overlap at their inner edges, as shown in Figs. 9, 10 and 11, and are stiffened by beads $h$. These covers are also hinged at their outer edges to the end walls 7$^b$ of the box, as for instance by cutting away the bead $b$ at intervals and by forming tongues $i$ integral with the covers $f$ and $g$ and bent around the core wires of the beads $b$ at the points where the latter are exposed, see Fig. 10. When the box is closed for storage the overlapping portions of the covers are secured by a suitable lock engaging a staple or loop $j$ extended from one of the covers and through a slot in the other, as shown in Fig. 10. In this form of box the sections are retained in their angular positions of use, as shown in Fig. 13, by latch bars and coöperating buttons similar to those described in connection with the first form of the invention.

In Figs. 14 and 15 is shown a further variation or fourth form of box which differs from the construction shown in Figs. 9 to 13 only in so far as the cover for the box is concerned. The variation consists in forming the covers $f'$ and $g'$ with side flanges $f^2$ which not only stiffen the covers, but serve to more effectually exclude the dust from the box. Furthermore, the covers are provided with hollow beads $h'$ which extend around their edges and inclose core wires $i'$. At each end of the box the core wire $i'$ of the cover is exposed by cutting away the bead $h'$ at intervals and the bead $b'$ of the adjacent section of the box is correspondingly cut away along the upper edge of the end wall thereof, the core wire $c$ of the bead $b'$ being thereby exposed. The hinge proper for connecting the end wall of the box and the adjacent cover section is in the form of a hinge-plate $l$ riveted or otherwise secured to the end wall and provided with a series of tongues $m$ which are bent to form sleeves encircling the core wires $i'$ and $c'$ at the points where said wires are exposed by the cutting away of the beads. In all other essential respects the box illustrated in Figs. 14 and 15 is identical with the box illustrated in Figs. 9 to 13 inclusive.

In all forms of the invention defacement of the desk or other support for the box is avoided by providing each of the box sections with rubber or other non-abrasive cushions or feet $x$.

Attention is directed to the fact that in all forms of the invention the box when closed for the storage of the blanks comprises a single compartment formed conjointly by box sections which, when opened out or extended, define separate, angularly related compartments the bottom walls of which are disposed in opposite angular planes. It will also be noted that in all forms of the invention the relatively movable box sections are retained in their open or extended positions by retaining means which operates automatically upon the opening of the case to securely lock the sections in position.

It is thought that from the foregoing, the construction and mode of manipulation of the described filing case will be clearly understood, but I wish to expressly reserve the right to effect such variations of the illustrated structure as may come fairly within the scope of the protection prayed.

What I claim is:—

1. A posting box comprising two sections forming conjointly a single compartment for the storage of statement blanks or other posting mediums and having a horizontal bottom wall, a hinged connection between the sections permitting the same to swing apart to form separate receptacles having their bottom walls slightly inclined in opposite directions from a horizontal plane to facilitate the shifting of the blanks from one compartment to the other during the posting operation, and means for locking the sections against relative movement when said sections are swung apart.

2. A posting box comprising two sections forming conjointly a single compartment for the storage of statement blanks or other posting mediums and having a horizontal bottom wall, a hinged connection between the sections permitting the same to swing apart to form separate receptacles having their bottom walls slightly inclined in opposite directions from a horizontal plane to facilitate the shifting of the blanks from one compartment to the other during the posting operation, and locking means brought into action by the relative movement of the sections to positively lock the same in their separated positions.

3. A posting box comprising two sections forming conjointly a single compartment for the storage of statement blanks or other posting mediums and having a horizontal bottom wall, a hinged connection between the sections permitting the same to swing apart to form separate receptacles having their bottom walls slightly inclined in opposite directions from the horizontal plane to facilitate the shifting of the blanks from one compartment to the other during the posting operation, and a locking device carried by one section and engaging the other to automatically lock the sections against relative movement when swung apart.

4. A posting box comprising two sections forming conjointly a single compartment for the storage of statement blanks or other posting mediums and having a horizontal bottom wall, a hinged connection between the sections permitting the same to swing apart to form separate receptacles having their bottom walls slightly inclined in opposite directions from a horizontal plane to facilitate the shifting of the blanks from one compartment to the other during the posting operation, and locking means opposing no resistance to the separative movement of the box sections but automatically operative to positively lock the sections in their separated positions.

5. A posting box comprising two sections forming conjointly a single compartment for the storage of statement blanks or other posting mediums and having a horizontal bottom wall, a hinged connection between the sections permitting the same to swing apart to form separate receptacles having their bottom walls slightly inclined in opposite directions from a horizontal plane to facilitate the shifting of the blanks from one compartment to the other during the posting operation, and a latch bar carried by one section and movable into locking engagement with the other section by the separative movement of said sections.

6. A posting box comprising two sections forming conjointly a single compartment for the storage of statement blanks or other posting mediums and having a horizontal bottom wall, a hinged connection between the sections permitting the same to swing apart to form separate receptacles having their bottom walls slightly inclined in opposite directions from a horizontal plane to facilitate the shifting of the blanks from one compartment to the other during the posting operation, a latch bar pivotally connected to one section and provided with an angular slot, and a projection carried by the other section and movable in the slot of the latch bar, said slot being arranged to permit separative movement of the sections and to cause a locking engagement of the parts when the sections have been swung apart.

7. A posting box including a pair of box sections hingedly connected at their bottoms and a cover, said sections forming conjointly a single interiorly unobstructed receptacle for the storage of statement blanks or other posting mediums and held against separative movement by the cover, and means limiting the separative movement of the box sections to dispose their bottom walls in obtuse angular relation to constitute said sections as separate receptacles from one to the other of which the blanks or posting mediums may be conveniently shifted during the operation of posting.

8. A posting box including relatively movable sections and a cover conjointly forming a closed receptacle, said cover being movable from normal position and said sections having relative separative movement to dispose their bottom walls in angular relation for support at their outer edges and means opposing the return of the box sections to normal position.

9. A substantially dust-proof posting box including a pair of hingedly connected sections and a cover conjointly forming a single interiorly unobstructed closed receptacle, said cover being movable from normal position and said sections having relative separative movement to dispose their bottom walls in obtuse angular relation for support at their outer edges, and means for locking the box sections when swung apart.

In testimony whereof I affix my signature in presence of two witnesses.

GEORGE F. WATT.

Witnesses:
J. M. CLEARY,
A. F. SMITH.